UNITED STATES PATENT OFFICE.

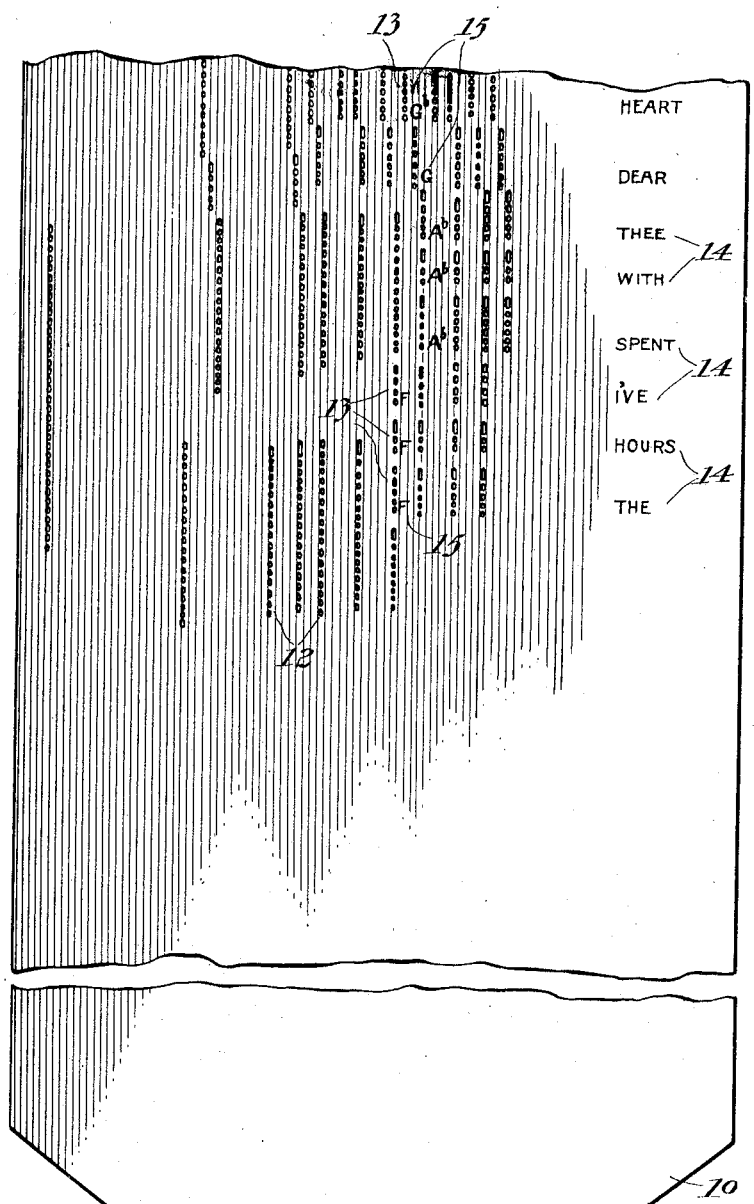

JOHN A. FISHER, OF CHICAGO, ILLINOIS, ASSIGNOR TO IMPERIAL PLAYER ROLL COMPANY, OF CHICAGO, ILLINOIS, A CORPORATION OF ILLINOIS.

NOTE-SHEET FOR AUTOMATIC MUSICAL INSTRUMENTS.

1,359,682.  Specification of Letters Patent.  Patented Nov. 23, 1920.

Application filed January 24, 1917.  Serial No. 144,184.

*To all whom it may concern:*

Be it known that I, JOHN A. FISHER, a subject of the King of Great Britain, residing at Chicago, in the county of Cook and State of Illinois, have invented new and useful Improvements in Note-Sheets for Automatic Musical Instruments, of which the following is a full, clear, concise, and exact description, reference being had to the accompanying drawing, forming a part of this specification.

My invention relates to note-sheets for automatic musical instruments.

One of the objects of my invention is to provide an improved note-sheet for the use of singers, from which the singer can readily determine the pitch of the note which is to be sung.

Further objects will appear from the detailed description to follow and from the appended claims.

In the drawing, in which an embodiment of my invention is shown, the figure shows the leader-end of a note-sheet embodying my invention.

Referring now to the drawing in detail, the note-sheet 10 may be of any suitable material, such as paper, and the leader-end may be provided with the usual ring 11 for engaging the hook of the take-up roll. The sheet is provided with suitable perforations 12 for controlling the sounding of the accompaniment notes of a musical composition and with suitable perforations 13 for controlling the sounding of the melody notes.

The words 14 of the selection are placed on the note-sheet, substantially in transverse alinement with the leading ends of the corresponding melody note-perforations. To enable the singer or reader to readily determine the pitch of the melody notes, suitable pitch-indicating indica 15 are placed adjacent the melody note-perforations 13.

Each melody note-perforation 13 has its own individual indicium indicating the pitch, intimately associated therewith, so that the reader at a glance may definitely determine the pitch of the note which is to be sung.

Having thus described my invention, what I claim as new and desire to secure by Letters Patent, is:—

1. A note-sheet for automatic musical instruments, provided with individual note-controlling devices for the individual melody and accompaniment notes, the individual note-controlling devices for the melody notes being provided with individual distinguishing characters, each of which characters indicates that the respective device corresponds to a melody note, and also indicates the pitch of that note.

2. A note-sheet for automatic musical instruments, provided with individual note-controlling devices for the individual melody and accompaniment notes, the individual note-controlling devices for the melody notes being provided with individual distinguishing characters, each of which characters indicates that the respective device corresponds to a melody note and also indicates the pitch of the corresponding note, each character being placed adjacent the corresponding note-controlling device.

3. A note-sheet for automatic musical instruments, provided with individual perforations for the individual melody and accompaniment notes, the individual perforations for the melody notes being provided with individual distinguishing characters, each of which characters indicates that the respective perforation corresponds to a melody note, and also indicates the pitch of the corresponding melody note.

In witness whereof, I have hereunto subscribed my name.

JOHN A. FISHER.